Dec. 18, 1962  F. R. LOWDERMILK ETAL  3,069,345
ELECTRODE CLAMP AND ASSEMBLY
Filed April 20, 1959
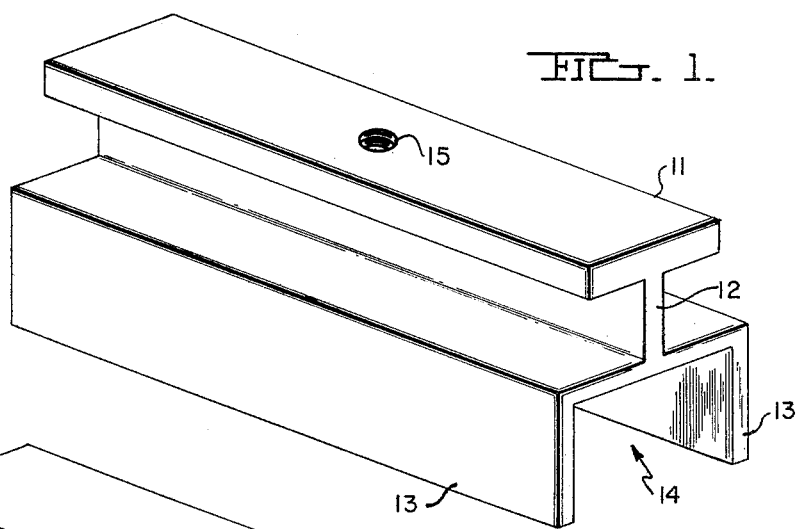
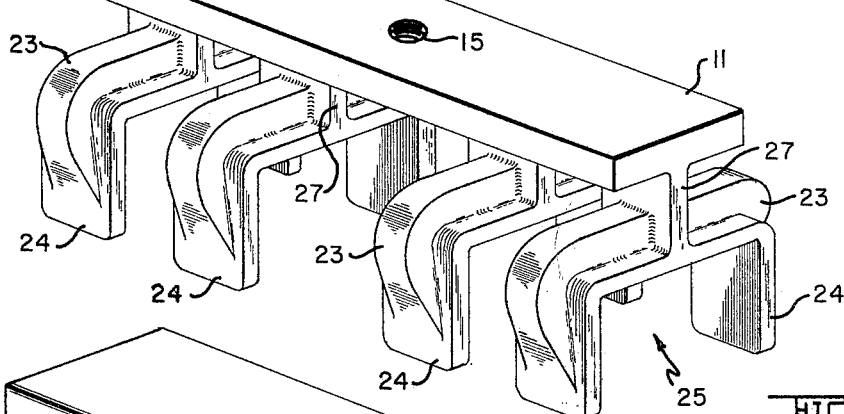
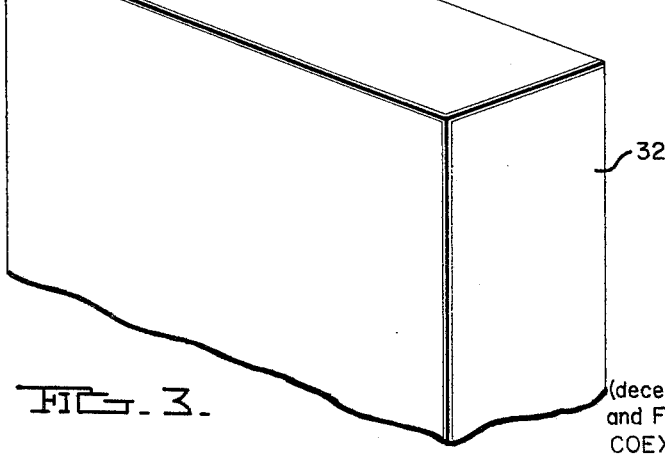
INVENTORS,
FORD R. LOWDERMILK
JOHN A. GRANT MacKAY
(deceased) MILDRED J. MacKAY
and Fidelity Philadelphia Trust Co.
COEXECUTORS United States Patent Office 3,069,345
Patented Dec. 18, 1962

3,069,345
ELECTRODE CLAMP AND ASSEMBLY
Ford R. Lowdermilk, Gwynedd Valley, and John A. Grant MacKay, deceased, late of Ambler, Pa.; by Mildred J. MacKay, coexecutrix, Oreland, Pa., and Fidelity-Philadelphia Trust Co., coexecutor, Philadelphia, Pa., assignors to Pennsalt Chemicals Corporation, Philadelphia, Pa., a corporation of Pennsylvania
Filed Apr. 20, 1959, Ser. No. 807,413
3 Claims. (Cl. 204—286)

This invention is directed to an electrode clamp and to an electrode clamp assembly comprising a clamp and an electrode wherein the clamp is adapted to support the electrode by mechanical compression.

In most electrochemical processes, the manner of conducting current to the electrolyte is a major problem. Generally, the current is brought in by a current lead to an electrode which is in contact with the electrolyte. When the eletcrolyte is a very corrosive liquid, the difficulties attendant upon conducting the current into the electrolyte are considerably increased. The reason for this is that when the electrolyte is a corrosive material, the electrolyte attacks and corrodes the means by which the electrode clamp supports the electrode. Since electrodes are usually made of a fragile material, such as a carbon, and if it is used in a cell which is sometimes exposed to internal explosions which tend to break the electrodes, then the methods by which the electrodes are supported in the electrolyte are further complicated. Thus, in addition to resisting corrosion means must be provided to make the electrode clamp somewhat flexible so that minor explosions will not break the fragile electrodes. This is particularly important in fluorine cells.

We have now discovered an electrode clamp and an integrally formed metallic, electrically conducting electrode clamp assembly which provide means for resisting corrosion from the electrolyte while at the same time providing means for imparting flexibility to the clamp and electrode assembly. Our clamp also supplies means for rapid assembly of the clamp and electrode.

Our invention will be better understood by a consideration of the accompanying drawings in which FIGURE 1 is a perspective view of our integrally formed metallic, electrically conducting clamp having a solid means for grasping the electrode; in which FIGURE 2 is a perspective view of a variation of the clamp of FIGURE 1 in which greater flexibility is imparted to the clamp by means of a plurality of horizontally-spaced clamping members of inverted U-shape or channel shaped transverse cross section; and in which FIGURE 3 is a perspective view of a rectangular bar electrode.

In FIGURE 1 the horizontally-extending electrode support plate or member is designated by the numeral 11 which supports the clamping member 13. The actual connection between the clamping member and the support member is shown at 12, which connection is thinner than the support member 11 so that the clamp has flexibility in a plane perpendicular to the plane of the clamp support plate 11. Numeral 14 designates the inverted U-shaped or channel shaped opening defined by the base portion and opposed side portions of clamping member 13, which portions are capable of being expanded by heat to allow for the insertion of the electrode 32 of FIGURE 3 within the opening 14. Numeral 15 shows the plate or support member 11 drilled to receive a suspending rod to hang the clamp and electrode assembly from the cell cover and also to carry electrical current to the clamping member 13 and to the electrode suspended therefrom. Hence, it may be said that the form of our invention shown in FIGURE 1 comprises an integrally formed metallic, electrically conducting electrode clamp which includes an elongated, horizontally-extending support plate 11, along the center portion of the undersurface of which there depends an elongated, horizontally-extending connecting plate 12 disposed in a plane normal to the plane of support plate 11 and having its lower edge integrally connected to the center portion of the base of a horizontally-extending, inverted U-shaped or channel shaped clamping member 13, the spaced, parallel side portions of which are adapted to engage and clamp therebetween the upper marginal portion of an electrode.

In FIGURE 2, the horizontally-extending, elongated support plate or member is also designated by the numeral 11, while the individual, horizontally-spaced clamp members of inverted U-shape or channel shape are designated by the numeral 24. In the electrode clamp of this form of our invention, the plurality of horizontally-spaced clamping members are disposed in horizontal alignment and are connected to the central portion of the undersurface of support member 11 by spaced, depending connecting plates 27, with the side portions of the respective individual clamping members disposed in spaced parallel planes so that said side portions concertedly clamp therebetween the upper marginal portion of an electrode. Additional metal in the form of a backing bar or plate to impart increased strength to each individual clamping member is designated by the numeral 23. The openings between the spaced, parallel, depending side portions of each of the individual, spaced clamping members 24 are designated by the numeral 25, while the numeral 15 designates a drilled or tapped opening adapted to receive a supporting rod or other means to attach the clamp and electrode assembly to the cell cover and to carry the electric current to the clamping means 24 and to the electrode clamped between the aligned and spaced side portions of the horizontally-disposed series of spaced clamping members 24. The spaced and aligned clamping plates 27 are, as stated, thinner than the cross section of support member 11 so that each clamping member 24 has flexibility in a plane perpendicular to the plane of the clamp support plate 11.

As will be readily apparent from an inspection of FIG. 2 of the accompanying drawing, the flat connecting plates 27 depend from the central or mid portion of the horizontally extending, elongated support plate 11 in horizontal alignment and in a plane preferably normal to the plane of said support plate. Hence, the respective aligned side portions of the individual, spaced clamping members 24 are arranged in single planes so that they can concertedly clamp therebetween the upper marginal edge of an electrode 32.

In FIGURE 3, the numeral 32 designates a rectangular shaped solid electrode.

A particularly easy way of providing the clamps of the invention is to cast them out of a metal suitable for conducting electricity and then machine the insides of the clamp members to fit the surfaces of the electrodes to be suspended therefrom. It will be apparent to all those skilled in the art that the new clamp holders provide a simple means of quickly installing an electrode in a clamp and thus provide a combination clamp and electrode assembly. The advantages of the new clamp and new combination of clamp and electrode are even more apparent when considered in the light of the prior art attempts to meet this situation.

The prior art in its efforts to secure the carbon electrodes to the copper or metallic conductors which are fastened to the body of the cell, used two methods in general. One method comprised the use of a heavy conductor such as a bus bar which was built into the cell. The carbon electrodes were kept in intimate contact with the bus bar by means of bolted clamps; the bolts either passed through holes drilled in the carbons or passed adjacent to the carbons on either end. Secondly, the carbon anodes were drilled and tapped to receive stud bolts and the electrode secured to the bus bar with stud bolts. Both of the above methods suffered from the following difficulties:

First, of all, the threads of the bolts used on the clamps become fouled and/or were corroded by the cell electrolyte. The corrosion products made them difficult to reuse and caused considerable down-time each time an electrode had to be replaced.

Secondly, contact between the carbon electrode and the metallic conductor was subject to chemical deterioration and chemical infiltraton. That is, the electrolyte would get under the metallic conductor at its point of contact with the electrode and would build up a resistance to the flow of electrical current from the metal conductor to the electrode at that point. The resistance of the flow of current would then increase to such a high value that the electrolytic cell would have to be shut down in order to improve the contacts.

Another defect in the prior art methods of using threaded studs or bolts inserted through carbon electrodes was caused by the brittleness of the carbons and by the fact that they possess very little tensile strength. Thus, in cells subject to internal explosions with the anodes attached by drilled studs or with stud bolts passing through the anodes, the carbon electrodes were rigidly held in place and were often broken in the cell even by minor explosions.

Another defect in using stud bolts was that small cracks would develop through strains in the carbon, and this would provide a ready means for ingress of the corrosive electrolyte which then would attack the metal and increase the crack to the breaking point. In addition, the electrical resistance was also greatly increased at that point. Also, when the carbons were tapped for stud bolts, the electrolyte often corroded the studs in place resulting in bursting of the carbon due to pressure from the corroded stud bolt. Bolts which extend through the carbons often cause the same trouble although not as frequently as when the carbons are tapped for stud bolts.

We have found that our new clamp and combination of clamp and electrode readily overcome these difficulties of the prior art. Thus there are no threads exposed to the action of the cell fluids which can be attacked and thus cause a breakage of the electrode and/or an increase in the electrical resistance at that point. Our combination of clamp and electrode can be quickly assembled and the electrode quickly installed merely by heating the clamp to a high temperature to cause expansion of the clamp which is then allowed to cool after insertion of the electrode into the opening or openings defined by the base and side portions of the clamp or clamps.

We have also found that instead of heating the clamp to expand it and then allowing it to cool and contract on the electrode material, that we can cool the electrode to a low temperature, insert it in the metal clamp holder and then allow the electrode to warm which will force it tightly against the clamp. Obviously, any combination of heating and cooling may be used.

Another advantage of our new clamp and electrode assembly is that it allows the electrode to be flexible in the plane perpendicular to the cell cover while being held comparatively rigid in other planes. This allows the carbon electrode to move slightly with the cell electrolyte in the event of an explosion in the cell and prevents the electrodes from being broken as would be the case with a non-flexible clamp. Moreover, our method of shrinking the clamps onto the carbon electrodes does away with exposed threads, tapped holes, drilled through bolts etc. and takes advantage of the high compressive strength associated with carbon electrodes. Also, the enormous pressure produced by the shrinkage of the metal on the electrode prevents the clamped areas from being attacked by seepage of the electrolyte liquors.

Another feature of our invention is that as much flexibility of the electrode may be designed into the clamp as is needed to meet the requirements of any particular electrochemical operation. Thus, the clamp of FIGURE 1 will hold an electrode in a fairly rigid position but will still permit some vibration in a plane perpendicular to the plane of the clamp holder. This amount of movement or vibration in that plane can be increased by decreasing the thickness of the flat depending, connecting plate 12 of the form of our invention shown in FIGURE 1, or the thickness of the flat, spaced depending connecting plates 27 of the form of our invention shown in FIGURE 2. Likewise the vibration or movement in that plane can be reduced by increasing the thickness of said connecting plate 12 or the thickness of the said spaced connecting plates 27.

Another means of increasing the flexibility and movement of the electrodes in a plane vertical to the clamp holder or cell cover is to provide a clamp having a plurality of horizontally-spaced and aligned individual clamping members as shown by 24 in FIGURE 2. This is particularly suited to electrode materials which are fragile and easily cracked such as carbon electrodes. The use of the plurality of such individual clamps permits great flexibility in the plane perpendicular to the plane of the clamp support plate member (11 in FIGURE 2) or the cell cover.

In applying our invention to the manufacture of fluorine by electrolyzing hydrofluoric acid in an electrolyte comprising molten potassium acid fluoride containing about 40% hydrofluoric acid by weight, we have used the metal clamp of FIGURE 1 and the series of spaced clamps of FIGURE 2 constructed of beryllium copper, with a dense amorphous carbon electrode. The carbon anodes were first machined so that the interior dimension of the clamp member, see 13 in FIGURE 1 and 24 in FIGURE 2, was a few thousandths of an inch less in width than the exterior width of the carbon anode 32 of FIGURE 3 which was 2 inches thick. The beryllium copper clamp was then heated in a welding flame to a red heat, the carbon anode was inserted in the holder and the clamp was allowed to cool thereby tightly gripping the carbon anode.

We found that in operating up to current densities of 100 amperes per square foot with carbon anodes size 2" x 5" x 25" that long anode life was obtained by our shrink-on clamps.

The shrink-on or compression type clamp of our present invention has the particular advantage of ready mounting which we found to be of great importance in reducing maintenance costs in the fluorine cell operation. Moreover, the great number of anode failures due to seepage of electrolyte into cracks in the carbons and failure due to cracking of the carbons from bolt holes was entirely eliminated. We also noted that there were no failures of the carbons due to explosions in the cell which was attributable to the fact that our clamp was also quite flexible.

We have found our new clamp and electrode clamp assembly to be applicable to all forms of carbon electrodes including graphite.

The new clamp can be constructed of any metal capable of carrying electricity and having a high linear coefficient of thermal expansion. Satisfactory metals for constructing the clamps of our invention are iron, copper including various copper alloys, lead, magnesium, aluminum and aluminum alloys, chromium, nickel, steel, bronze and brass. These metals all have a positive linear coefficient of thermal expansion and are good conductors of electricity. Metals having a linear coefficient of thermal expansion varying from .000003 to .000035 are satisfactory in our clamp and electrode and clamp assembly. We have found that beryllium copper is particularly useful metal for the highly corrosive conditions encountered in a fluorine cell.

In preparing the electrode assembly comprising the clamp and electrode, it is necessary that the portion of the electrode which is to be engaged in compression by the clamp must be machined to an even surface. Similarly, the portion of the clamp which will engage the electrode must be machined to the same evenness and a few thousandths of an inch less in dimension than the corresponding electrode. This is necessary because the electrolytic cells usually operate at a temperature higher than that at which the electrodes and clamps are machined. Thus, provision must be made for the coefficients of thermal expansion of the electrode and of the metal clamp at the temperatures at which they will be used in the electrolytic cells.

In assembling the electrode and the clamp after they have been properly machined, the clamps are heated by placing them in an oven or by heating them with a welding torch to a red heat at which point the carbons are inserted into the clamps, and they are thereafter allowed to cool. The carbons do not have to be preheated. Cooling in air is quite satisfactory. When it is desired to remove a clamp to install a new electrode for any reason such as normal wear of the electrode, the clamp while still engaging the electrode is then heated in an oven or with a torch to a temperature sufficiently to loosen the clamp by expansion of the metal.

While we have described our clamps and electrodes in terms of a horizontal or rectangular clamp and a rectangular electrode, it will be apparent to those skilled in the art that the invention is equally applicable to circular electrodes or to electrodes having other shapes. In such a case the clamp would merely be designed to fit the shape of the desired electrode. In the case of a circular electrode the clamp could have either one circular clamping member in the form of a cylinder or two or more fingers similar to element 24 of FIGURE 2, but with the inner surfaces having the same curvature as the electrode. Other forms of clamps and electrodes will suggest themselves to the workers skilled in the art for particular purposes.

We claim:

1. An integrally formed metallic, electrically conducting clamp for use in suspending a rectangular shaped carbon electrode in an electrochemical cell, said clamp comprising a horizontal elongated support plate, flat horizontally aligned and horizontally spaced connecting plates depending from said horizontal support plate to a plurality of individual longitudinally spaced clamping members, said connecting plates lying in a plane parallel to the axis of said support plate and being thinner than said support plate, a plurality of individual clamping members each of inverted channel-shaped cross section including a base member and two spaced, parallel side portions, said clamping members being supported from said elongated support member by one of said connecting plates connected to the base portion of said clamping member, said side portions of each clamping member extending downwardly from said base portion of said clamping member thereby forming means to clamp a rectangular shaped carbon electrode within the space formed by said base and side portions of said clamping members, said channel-shaped clamping members being aligned on said connecting plates to concertedly clamp between said side plates the upper marginal edge of a rectangular shaped carbon electrode, said clamping members having a positive coefficient of thermal expansion such that on heating the distance between said side portions of said clamping members is enlarged sufficiently to receive therebetween an electrode whereby on cooling to cell operating temperature, the distance between said side portions is decreased, causing said side portions to firmly grip the upper marginal edge of an electrode inserted between said side portions.

2. The electrode clamp of claim 1 constructed of beryllium copper.

3. A clamp and electrode assembly for an electrochemical cell including a clamp as defined in claim 1 and comprising a rectangular-shaped carbon electrode secured between the side portions of said inverted channel-shaped clamping members of claim 1.

References Cited in the file of this patent

UNITED STATES PATENTS

| 674,927 | Mauran | May 28, 1901 |
| 882,110 | Hill | Mar. 17, 1908 |
| 1,053,881 | Scott et al. | Feb. 18, 1913 |
| 1,371,073 | Crandall | Mar. 8, 1921 |

FOREIGN PATENTS

| 19,953 | Great Britain | of 1892 |
| 277,295 | Switzerland | Nov. 16, 1951 |
| 489,984 | Canada | Jan. 27, 1953 |